United States Patent Office 3,150,369
Patented Sept. 22, 1964

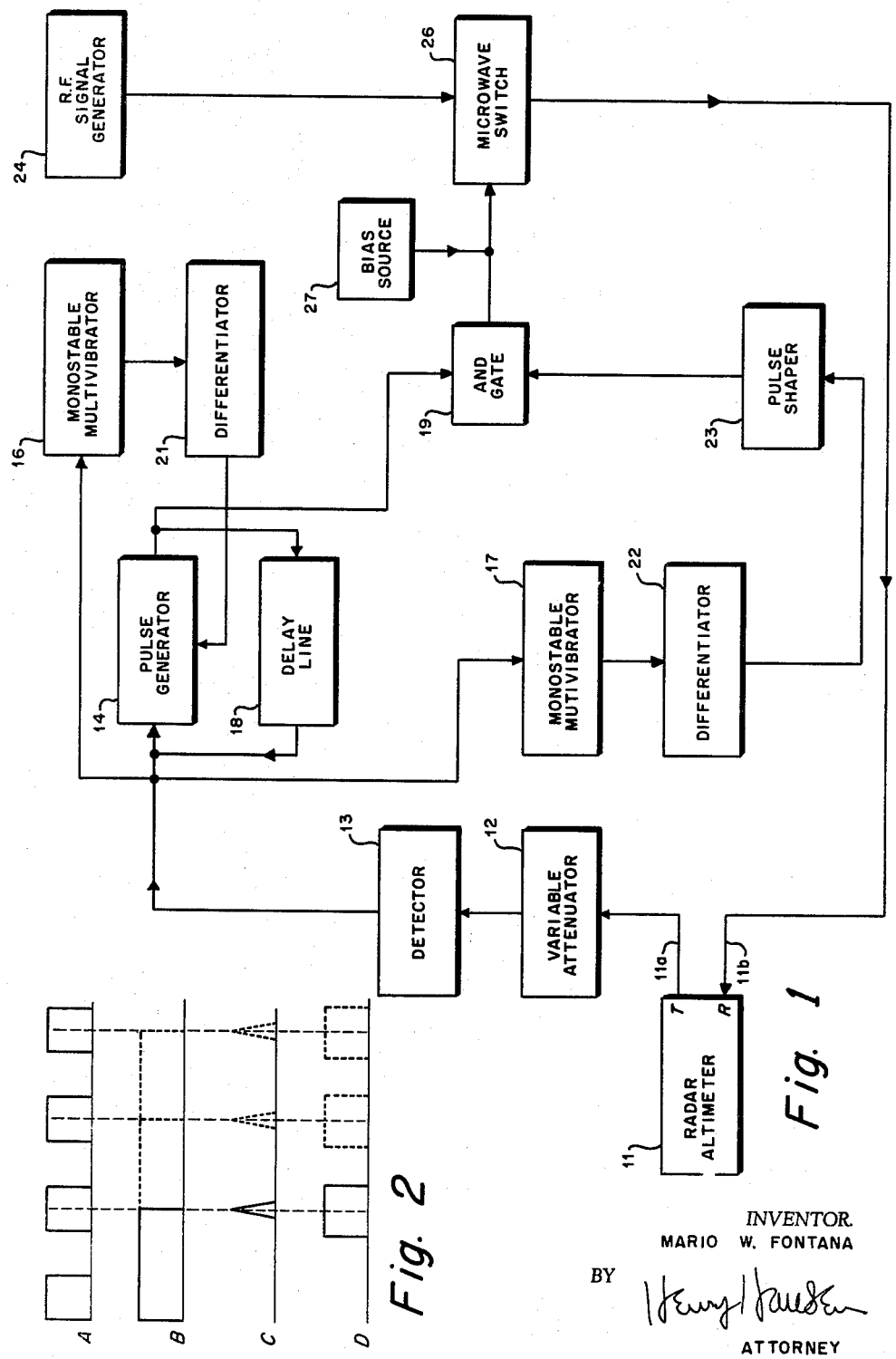

3,150,369
RADAR RANGE SIMULATOR
Mario W. Fontana, Ivyland, Pa., assignor to the United
States of America as represented by the Secretary of
the Navy
Filed May 29, 1963, Ser. No. 284,267
9 Claims. (Cl. 343—17.7)
(Granted under Title 35, U.S. Code (1952), sec. 266)

The invention described herein may be manufactured and used by or for the Government of the United States of America for governmental purposes without the payment of any royalties thereon or therefor.

The present invention relates to a range simulator and more particularly to a radar range simulator for providing accurately timed pulses which simulate radar pulses reflected from objects at various angles.

Effective use of pulse-type radar systems demands development of techniques and equipment for testing, calibrating, and evaluating the reliability and accuracy thereof both in the development stage and the postproduction stage when the systems may be in strategic use. Thus, simultaneously with the development of these radar systems there must be developed means and methods for testing and evaluation. One method of testing the dynamic characteristics of a pulse-type radar system is to simulate and provide to the radar receiver accurately timed echo pulses representative of various ranges at which the radar system is from a target. The test equipment for simulating these pulses is necessary in checking reliability and accuracy of the radar system, as well as correction or calibration of the radar system when it proves inaccurate and/or unreliable.

Obviously simulators of this type must themselves be highly accurate and reliable.

Radar range simulators of the pulse-type presently in use incorporate lumped constant video delay lines for simulation of range. Every range position in these types must be calibrated individually. The underlining disadvantage of this type of simulator is that as the delay is increased the ability to measure the delay becomes more difficult and less accurate. Furthermore, additional errors may be introduced into the simulator system that uses video delay lines since the pulse shapes derived from this type of system are incapable of fast enough rise time to provide the required accuracy.

The present invention contemplates a radar range simulator wherein the time between occurrence of a transmitted pulse and a simulated echo pulse may be accurately controlled whereby various ranges may be accurately simulated for the radar system.

More specifically the present invention contemplates a radar range simulator for producing accurately delayed echo pulses for use in conjunction with a pulse-type radar altimeter by accurately controlling elapsed time between the transmitted pulse and the provision of the simulated echo pulse to the receiver. In accordance with the present invention a simulated echo pulse is connected to the radar receiver in response to the occurrence of any selected one of the pulses in a pulse train generated by nanosecond pulse generator which is triggered on by the transmitted pulse from the radar system to be tested. The system of the present invention simulates any one of an almost infinite number of ranges with accuracies of the order of ±0.5 feet.

The particular manner in which pulses in a pulse train are utilized to cause occurrence of a simulated echo pulse at accurately controllable intervals after a transmitted pulse forms the subject matter of this invention.

It is an object of the present invention to provide a radar range simulator which provides accurately timed pulses at various selected delays after occurrence of a transmitted pulse.

Another object of the present invention is to provide a radar range simulator for testing a radar altimeter wherein pulses simulative of radar echo pulses are provided to the receiver of the altimeter at precisely controllable intervals initiated by a transmitter pulse.

A further object of the present invention is to provide a system for simulating radar ranges having accuracies limited only by the accuracy of a pulse generator.

Still another object of the present invention is to provide a radar range simulator for simulating ranges to within ±0.5 feet wherein actual percentage error is decreased as range is increased.

With these and other objects in view as will hereinafter fully appear and which will be more particularly pointed out in the appended claims reference is now made to the following description taken in connection with the accompanying drawings in which:

FIG. 1 illustrates in block diagram form a preferred embodiment of the present invention;

FIG. 2 is a graphic representation of the time and pulse relationships involved.

Referring now to FIG. 1 there is shown a radar altimeter 11 of conventional design having a terminal 11a connected to its transmitter and a terminal 11b connected to its receiver. A variable attenuator 12 has its input portion connected to terminal 11a and its output portion connected to detector 13. The output terminal of the detector 13 is connected to the input terminal of a nanosecond pulse generator 14, as well as to the input terminals of fixed pulse width monostable multivibrator 16 and variable pulse width monostable multivibrator 17. The output terminal of nanosecond pulse generator 14 is connected to delay line 18 and to one input terminal of "and" gate 19. The other side of delay line 18 is connected to the input terminal of nanosecond pulse generator 14. The output terminal of monostable multivibrator 16 is connected to differentiator 21 which, in turn, has its output terminal connected back to nanosecond pulse generator 14.

Differentiator 22 receives the output from monostable multivibrator 17 and provides an input to avalanche pulse shaper 23. A second input to "and" gate 19 is provided by avalanche pulse shaper 23.

RF signal generator 24 is connected to termianl 11b of radar altimeter 11 through normally open microwave switch 26. A microwave switch bias source 27 is connected to the output of "and" gate circuit 19.

When radar altimeter 11 is put into operative mode, it transmits a transmitter pulse at predetermined intervals. In normal operation the transmitter pulse is transmitted via an antenna not shown and the reflected pulse is received via the antenna by the receiver of radar 11. As is well known the time interval between occurrence of the transmitted pulse and the received or echo pulse is representative of range or altitude. The present invention is connected to the radar altimeter as shown at terminals 11a and 11b.

Each transmitter pulse is fed to variable attenuator 12 which may be adjusted to suit the altitude being simulated. Variable attenuator 12 is necessary to prevent burnout or injury to the equpiment since the transmitter power output varies with altitude. After demodulation by detector 13, the transmitter pulse is simultaneously fed to nanosecond pulse generator 14, monostable multivibrator 17, and monostable multivibrator 16.

On receipt of the transmitter pulse nanosecond pulse generator 14 is triggered on and provides a train of pulses which are approximately five nanoseconds wide with a rise time of less than one nanosecond. The output of nanosecond pulse generator 14 is fed back to the input through delay line 18. This causes nanosecond pulse generator 14 to generate a pulse train having a period which is a function of the delay of delay line 18. This pulse period can be measured accurately and will repeat indefinitely until nanosecond pulse generator 14 is gated off. Since nanosecond pulse generator 14 is triggered by the transmitter pulse, the pulse period is synchronized with the transmitter pulse.

Monostable multivibrator 16 which is triggered by the transmitter pulse provides an output pulse of fixed width which is differentiated in differentiator 21. The pulse produced by differentiator 21 in response to the trailing edge of the pulse from monostable multivibrator 16 is fed to nanosecond pulse generator 14 and gates nanosecond pulse generator 14 off. The exact time of gating nanosecond pulse generator 14 off is not critical so long as it is gated off before occurrence of the next transmitter pulse from radar altimeter 11. The pulse train from nanosecond pulse generator 14 may be allowed to run sufficiently to produce the total delay required by the system under test plus a little more before being gated off. The pulse train output from nanosecond pulse generator 14 provides one of the inputs to "and" gate 19.

As aforesaid the transmitter pulse from radar altimeter 11 is fed to monostable multivibrator 17. The width of the output pulse from monostable multivibrator 17 may be varied in steps such that the trailing edge of this pulse is made to occur within the duration of any selected one of the pulses generated by nanosecond pulse generator 14. The pulse from monostable multivibrator 17 is differentiated by differentiator 22 and the pulse provided by differentiator 22 in response to the trailing edge of the pulse from monostable multivibrator 17 is fed to avalanche pulse shaper 23. Differentiator 22 includes an invertor to provide only positive pulses at its output. The output from avalanche pulse shaper 23 provides a pulse in response to the desired pulse from differentiator 22 which is of slightly greater duration than any one of the pulses in the pulse train produced by nanosecond pulse generator 14 but which is not wide enough to encompass more than one pulse at any time.

Coincidence of occurrence of a pulse in the pulse train from nanosecond pulse generator 14 and the pulse from avalanche pulse shaper 23 causes "and" gate 19 to provide a switching pulse to microwave switch 26 causing the output terminal from RF signal generator 24 to be connected to the receiver end of radar altimeter 11 via terminal 11b for a short period. Bias source 27 provides correct bias voltage to microwave switch 26 to assure sensitive response to the pulse from "and" gate 19.

Thus, in response to each transmitter pulse the present invention generates a simulated echo pulse for application to the receiver of radar altimeter 11. This simulated echo pulse may be caused to occur at accurately timed intervals after occurrence of the transmitter pulse since every pulse period of the pulse train from nanosecond pulse generator 14 is a multiple of the first pulse period. With this knowledge it is a simple matter to vary in steps equal to a pulse period of the pulse train the pulse width of the pulses from monostable multivibrator 17. Thus, the time of occurrence of the simulated echo pulse with respect to the transmitter pulse may be accurately controlled in steps limited only by the time duration of a pulse period in the pulse train which may be of the order of 100 nanoseconds or less providing accuracies in the order of ±0.5 feet.

FIG. 2 illustrates the pulse relationship of the present invention and is included as an aid to understanding the operation of the present invention. Line A of FIG. 2 illustrates the first four pulses in the pulse train from pulse generator 14. It should be noted that the first occurring pulse in the pulse train occurs at a somewhat later time than the transmitter pulse but since this delay may be accurately measured it does not affect the accuracy of operation of the present inventon. Line B of FIG. 2 illustrates the variable width pulse output from monostable multivibrator 17. The solid line represents a pulse having a width such that its trailing edge occurs during the second of the pulses in the pulse train of line A. The first dotted vertical line represents the trailing edge of a pulse from monostable multivibrator 17 having a width which puts the trailing edge within the third occurring pulse in the pulse train of line A. The second dotted vertical line represents a third pulse of increased width from monostable multivibrator 17. The width of the pulses from monostable multivibrator 17 can be varied in such precise steps as to always cause the trailing edge of the pulses to occur during a pulse of the pulse train when the first pulse period in each pulse train is accurately known since subsequent pulse periods are multiples of the first period. Accordingly, it is a simple matter to adjust monostable multivibrator 17 to provide a pulse having a trailing edge occurring during any one of the pulses from nanosecond pulse generator 14. The manner in which monostable multivibrator 17 may be adjusted to vary in steps the width of the output pulse so as to cause the trailing edge to fall within a selected pulse of the pulse train may be done in any convenient manner, for example, as by varying a capacitance within the monostable multivibrator in a manner not unlike changing stations in a television receiver.

Line D of FIG. 2 represents the inverted differentiated pulses which are coincident with the trailing edge of the pulses from monostable multivibrator 17 as shown in line B. Line D represents the output from pulse shaper 23 which provides pulses in response to the differentiated pulses from differentiator 22 which occur coincident with the pulses in the pulse train but which may be shaped to have a somewhat larger width. Occurrence of one of these pulses in coincidence with a pulse in a pulse train causes "and" gate 19 to provide a pulse to microwave switch 26 thereby actuating microwave switch 26 as previously described.

Obviously many modifications and variations of the present invention are possible in the light of the above teachings. It is, therefore, to be understood that within the scope of the appended claims the invention may be practiced otherwise than as specifically described.

What is claimed is:
1. In a radar range simulator:
  pulse generator means providing a pulse train in which each pulse period is equal to the pulse period of the first pulse in the pulse train,
  multivibrator means providing a pulse of selectable width,
  coincidence circuit means connected to said pulse generator means and said multivibrator means providing an output when the trailing edge of said pulse from said multivibrator means occurs in coincidence with any one of the pulses in said pulse train.
2. In a radar range simulator:
  transmitter means providing a transmitter pulse at predetermined intervals,
  pulse generator means connected to said transmission means providing a pulse train in which each pulse period is equal to the pulse period of the first pulse in said pulse train in response to each transmitter pulse,
  multivibrator means connected to said transmitter means selectively providing a pulse having a width equal to a multiple of said pulse period in response to each transmitter pulse,
  coincidence circuit means connected to said pulse generator means and said multivibrator means providing an output pulse when the trailing edge of said pulse from said multivibrator means occurs in coincidence with any one of the pulses in said pulse train and having a time of occurrence with respect to one of said transmitter pulses dependent on the selected width of said pulse from said multivibrator means.

3. In a radar range simulator:

transmitter means providing a transmitter pulse at predetermined intervals, pulse generator means connected to said transmitter means providing a pulse train in which each pulse period is equal to the pulse period of the first pulse in said pulse train in response to each transmitter pulse, first multivibrator means connected to said transmitter means and said pulse generator means providing a pulse a predetermined time after occurrence of a transmitter pulse but prior to the next occurring transmitter pulse for gating said pulse generator means off, second multivibrator means connected to said transmitter means providing a pulse having a width equal to a selected multiple of said pulse period in response to each transmitter pulse, coincident circuit means connected to said pulse generator means and said second multivibrator means providing an output pulse when the trailing edge of said pulse from said first multivibrator means occurs in coincidence with any one of the pulses in said pulse train whereby said output pulse from said coincidence circuit means occurs at a selected time after occurrence of a transmitter pulse.

4. A radar range simulator, comprising in combination:

radar altimeter means including a transmitter and receiver, pulse generator means connected to said transmitter providing a train of equally timed pulses in response to a transmitter pulse, circuit means connected to said transmitter and said pulse generator means providing an output pulse in response to any desired one of said pulses in said pulse train, RF generator means, normally open switch means connected between said RF generator means and said receiver, conductor means connecting said circuit means to said switch means whereby said switch means is closed by said output pulse from said circuit means and an RF pulse is fed to said receiver.

5. A radar range simulator, comprising in combination:

radar altimeter means including a transmitter and receiver, pulse generator means connected to said transmitter providing a train of equally timed pulses in response to a transmitter pulse, means connected between said transmitter and said pulse generator means gating said pulse generator off slightly prior to a next occurring transmitter pulse, circuit means connected to said transmitter and said pulse generator means providing an output pulse in response to any desired one of said pulses in said pulse train, RF generator means, normally open switch means connected between said RF generator means and said receiver, conductor means connecting said circuit means to said switch means whereby said switch means is closed by said output pulse from said circuit means and an RF pulse is fed to said receiver.

6. A radar range simulator, comprising in combination:

radar altimeter means including a transmitter and receiver, nanosecond pulse generator means connected to said transmitter providing a train of equally spaced pulses in response to a transmitter pulse, monostable multivibrator means connected to said transmitter providing a pulse of predetermined width, differentiator means connected between said monostable multivibrator means and said nanosecond pulse generator means triggering said nanosecond generator means off in response to the trailing edge of said pulse from said monostable multivibrator means, circuit means connected to said transmitter and said nanosecond pulse generator means providing an output pulse in response to any desired one of said pulses in said pulse train, RF generator means, normally open switch means connected between said RF generator means and said receiver, conductor means connecting said circuit means to said switch means whereby said switch means is closed by said output pulse from said circuit means and an RF pulse is fed to said receiver.

7. A radar range simulator, comprising in combination:

radar altimeter means including a transmitter and receiver, pulse generator means connected to said transmitter providing a train of equally spaced pulses in response to a transmitter pulse, monostable multivibrator means connected to said transmitter providing a pulse of selectable width in response to a transmitter pulse, differentiator means connected to said monostable multivibrator means providing an output pulse in response to the trailing edge of said pulse from said monostable multivibrator means, pulse shaper means connected to said differentiator means providing a pulse output in response to the pulse output from said second differentiator means having a duration slightly longer than any one of the pulses from said pulse generator means, "and" gate circuit means connected to said pulse generator means and said pulse shaper means providing an output when one of the pulses from said generator means is in coincidence with said pulse from pulse shaper means, RF signal generator means, normally open microwave switch means connecting said RF signal generating means to said receiver, means connecting said "and" gate circuit means to said microwave switch means whereby said microwave switch means is closed in response to said output from said "and" gate circuit means providing an RF signal pulse to said receiver.

8. A radar range simulator, comprising in combination:

radar altimeter means including a transmitter and receiver:

pulse generator means connected to said transmitter providing a train of equally spaced pulses in response to a transmitter pulse, means connected between said transmitter and said pulse generator means gating said pulse generator means off slightly prior to a next occurring transmitter pulse, monostable multivibrator means connected to said transmitter providing a pulse of selectable width in response to a transmitter pulse, differentiator means connected to said monostable multivibrator means providing an output pulse in response to the trailing edge of said pulse from said monostable multivibrator means, pulse shaper means connected to said differentiator means providing a pulse output in response to the pulse output from said second differentiator means having a duration slightly longer than any one of the pulses from said pulse generator means, "and" gate circuit means connected to said pulse generator means and said pulse shaper means providing an output when one of the pulses from said generator means is in coincidence with said pulse from pulse shaper means, RF signal generator means, normally open microwave switch means connecting said RF signal generating means to said receiver, means connecting said "and" gate circuit means to said microwave switch means whereby said microwave switch means is closed in response to said output from said "and" gate circuit means providing an RF signal pulse to said receiver.

9. A radar range simulator, comprising in combination:

radar altimeter means including a transmitter and receiver, nanosecond pulse generator means connected to said transmitter providing a train of equaly spaced pulses in response to a transmitter pulse, first monostable multivibrator means connected to said transmitter providing a pulse of predetermined width in response to a transmitter pulse, first differentiator means connected between said first monostable multivibrator means and said nanosecond pulse generator means gating said nanosecond pulse generator means off in response to the trailing edge of said pulse from said first monostable multivibrator means.

second monostable multivibrator means connected to said transmitter pulse, second differentiator means connected to said second monostable multivibrator means providing an output pulse in response to the trailing edge of said pulse from said second monostable multivibrator means, pulse shaper means connected to said second differentiator means providing a pulse output in response to the pulse output from said second differentiator means having a duration slightly longer than any one of the pulses from said nanosecond pulse generator means, "and" gate circuit means connected to said nanosecond pulse generator means and said pulse shaper means providing an output when one of the pulses from said nanosecond pulse generator means is in coincidence with said pulse from pulse shaper means, RF signal generator means, normally open microwave switch means connecting said RF signal generator means to said receiver, means connecting said "and" gate circuit means to said microwave switch means whereby said microwave switch means is closed in response to said output from said "and" gate circuit means providing an RF signal pulse to said receiver.

References Cited in the file of this patent
UNITED STATES PATENTS

| | | |
|---|---|---|
| 2,482,974 | Gorden | Sept. 27, 1949 |
| 2,952,848 | Zahalka et al | Sept. 13, 1960 |